Aug. 2, 1966   J. A. LACHANCE   3,263,775
GROCERY CART AND CHECKOUT COUNTER WITH COOPERATING
CONVEYOR DRIVE MEANS
Filed Sept. 9, 1964
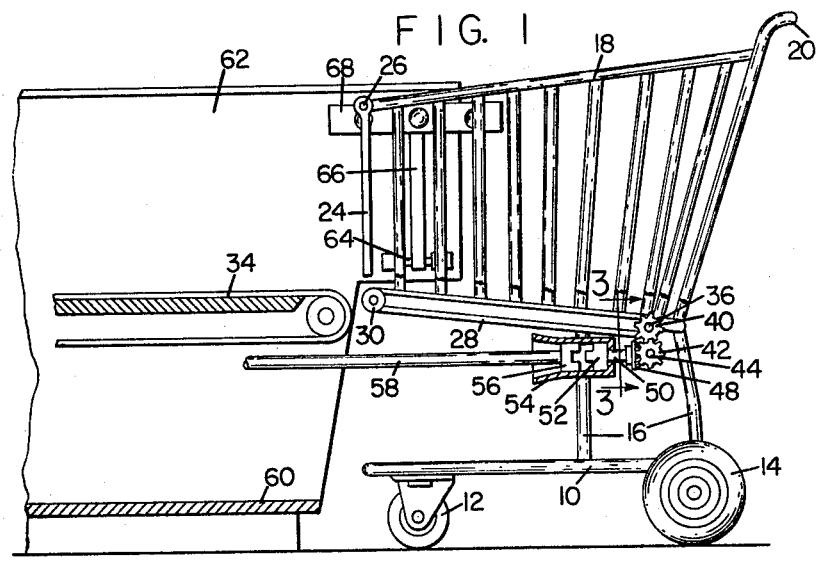
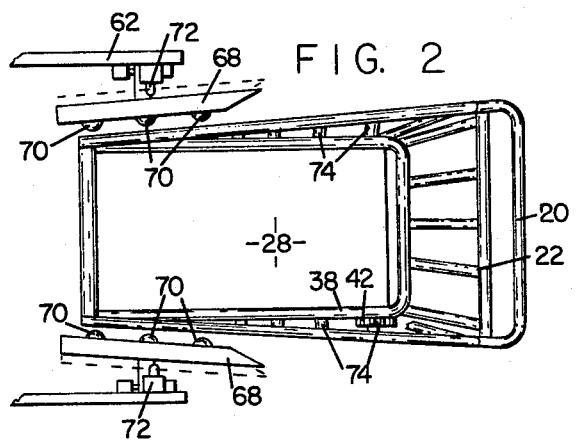
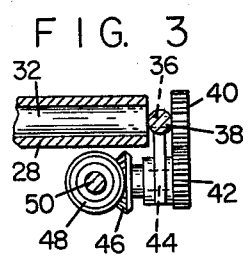
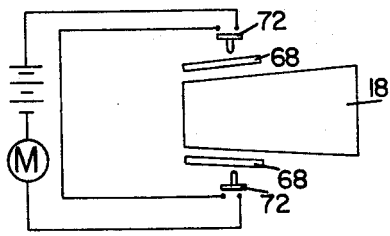
INVENTOR
JOSEPH A. LACHANCE
BY Charles R. Fay
ATTORNEY

United States Patent Office 3,263,775
Patented August 2, 1966

3,263,775
GROCERY CART AND CHECKOUT COUNTER WITH COOPERATING CONVEYOR DRIVE MEANS
Joseph A. Lachance, Auburn, Mass., assignor to Armand A. Lachance, Auburn, Mass.
Filed Sept. 9, 1964, Ser. No. 395,142
4 Claims. (Cl. 186—1)

This invention relates to a new and improved grocery cart or the like, the same being provided with means for automatically ejecting the contents therefrom to be automatically positioned at an accounting or checkout station and thereafter packed for the customer, with the particular purpose of speeding up the waiting line of customers as they pass the chargeout desk, or in any similar relationships.

The principal object of the invention includes the provision of a grocery cart as above described which has the usual rear swinging gate and which tapers so that the carts may be nested, and having a front gate which can be opened to allow the articles in the cart to be passed forwardly out through the front thereof (or possibly in some cases at the side) under power means derived from the provision of an endless belt forming the bottom of the cart, and the specific application of a positive gearing mechanism with respect to said belt to drive the same.

Another object of the invention includes the provision of power operated means located adjacent the checkout station for automatic clutching with the above recited positive gear means and including means for guiding the cart into correct position for the clutching action; and, further, the provision of an automatic switch for energizing a motor for driving the operating means located at the checkout counter, said means including a switch which is actuated by the motion of the cart itself as it comes to rest in the correct position for engagement with the power operated means located at the counter.

Other objects and advantages of the invention will appear hereinafter.

Reference is to be had to the accompanying drawings in which:

FIG. 1 is a view in elevation, partly in section, illustrating the invention and showing the cart substantially in operating position relative to the checkout counter:

FIG. 2 is a plan view thereof with the counter removed;

FIG. 3 is an enlarged section on line 3—3 of FIG. 1, and

FIG. 4 is a diagram showing a simple circuit for energizing the shaft.

In illustrating the invention, it has been shown as applied to a grocery cart but the invention can be applied to other carts as well if found desirable or convenient. Such grocery carts are normally provided with an under carriage or frame 10 having front wheels 12 and rear wheels 14, together with a vertical frame generally indicated by the reference numeral 16 which extends upwardly and supports a basket ordinarily made of wire, this basket being indicated at 18. The basket has a pusher handle and a rear swinging gate as is customary, these being shown at 20 and 22 respectively and as is well known in the art these carts nest so as to take up as little space as possible when not being used.

The present cart however also has a swinging front gate 24 which can be latched by any desired mechanism not shown and opened by swinging upwardly about a pivot axis which is indicated at 26, to allow ejection of groceries which are resting on an endless belt 28 forming the bottom of the cart. The endless belt 28 is mounted on a pair of fore-and-aft rollers as at 30 and 32 journaled in any way desired in the framework of the basket at the bottom thereof, and it will be seen that upon energization of the belt 28 in the proper direction, and gate 24 swinging upwardly in a clockwise direction in FIG. 1, anything supported on the belt 28 will be traveled to the left in FIG. 1 onto another belt 34 which continues the travel of the goods to the counter. The belt 34 is not necessary but is desirable.

In order to apply power to the belt 28, this invention contemplates the provision of a shaft 36 (see FIG. 3) which is conveniently journaled e.g. in the side frame member 38 of the lower portion of the basket or similar frame member or the like.

This shaft is provided with a gear of any convenient kind such as the spur gear 40, which is in mesh with a gear 42 on a shaft 44 appropriately mounted on a bracket but depending from frame member 38. The shaft 44 is driven by gears 46 and 48, driven in turn by a shaft 50 on which is mounted a clutch part 52. The clutch part 52 is of course rotatably mounted but it is housed in a funnellike member which extends forwardly of the cart, this funnel being indicated by the reference numeral 54 on the upright framework 16. It is to be noted that the funnel 54 points forwardly. Clearly when the clutch 52 is driven, the belt 28 will be traveled in the appropriate direction.

In order to drive the clutch part 52 there is a complementary clutch part 56 mounted on a shaft 58 which is journaled in any way desired being driven by a motor (not shown) mounted in the cabinet structure 60 of the checkout counter. Appropriate side walls may be provided to protect shaft 58 as may be desired, but in any event there is provided a support or the like 62 upon which is mounted a pivot pin 64. Pivot 64 mounts an upright lever 66 which in turn mounts at its upper end a roller bar 68 having freely mounted upright rollers 70. Appropriate springs (not shown) can be utilized for holding the bar 68 in a neutral position as shown in FIG. 2. This structure is duplicated at the opposite side of the counter and is used for guiding the cart into the correct position to align clutch face 56 with 52 for operation of the device. Switches such as microswitches of well known design at 72 are provided so as to energize the motor (not shown) for shaft 58 only when the cart is completely home in clutch-engaged position, i.e., with the cart slightly to the left from the FIG. 1 showing. The motor will not start until both switches are depressed and the goods will not start to move until such time as the cart is firmly in position completely covering the shaft 58 which of course is in line with shaft 50 (see FIG. 3).

It will be seen that the invention provides a relatively simple but positively geared apparatus for the purpose described, that is, of automatically delivering goods to the checkout counter from the cart. The apparatus is not energized until the cart is correctly positioned, thus minimizing any chance of accidental malfunction. The bars 68 not only can move from and to the cart but they can also pivot about the lever 66 as an axis so as to provide for a floating guiding construction for correctly placing the cart where desired.

It is also to be noted as shown in FIG. 2 that whereas the belt 28 of course must be of uniform width throughout, the side walls of the cart taper downwardly and inwardly as at 74. This taper is in addition to the forward and aft taper also shown in FIG. 2. Therefore in spite of the fact that the belt is of uniform width and the cart tapers, nevertheless there is no opening anywhere for the goods to fall off of the rear gate 22, the side walls coming smoothly down in a tapered configuration to completely surround the belt preventing the loss of articles on the belt.

The diagram in FIG. 4 illustrates how the cart, being moved in the direction of the arrow, impinges upon the movable members 68, 68, and thus closes the contacts at 72, 72. It is also clear that both of these contacts have to be closed before the motor M will energize the shaft 58.

Having thus described my invention and the advantages thereof, I do not wish to be limited to the details herein disclosed, otherwise than as set forth in the claims, but what I claim is:

1. The combination with a checkout counter including a driven shaft thereon and means controlling the operation thereof; of a grocery cart or the like including a wheeled frame, a basket mounted thereon in elevated condition with respect thereto, said basket including convergent sides and an openable forward wall, an endless belt comprising the bottom of the basket, and means mounted on said cart for engaging said driven shaft to be driven thereby, said last-named means including clutching means, gearing on the cart associated therewith, said gearing being driven through the clutching means from said shaft, and being operatively connected to the belt to drive the same in a predetermined direction toward the openable front gate, said clutching means being detachable so that the grocery cart can approach and retreat from the driven shaft at the counter to become clutched and disengaged, guide means to guide the cart to a cooperative clutching position with regard to said clutching means, said control means comprising an electric switch mounted to be engaged by said guide means, the guide means being mounted to move generally freely so as to engage and impinge upon and actuate said electric switch.

2. The combination of claim 1 wherein said guide means and electric switch mechanism are duplicated and mounted on the counter in spaced relation to engage opposite sides of the cart.

3. In combination, a checkout counter including a driven shaft, with a grocery cart which includes a lower wheel frame and a tapering basket mounted thereon, said cart being capable of nesting with like carts, the bottom of the cart comprising an endless belt slanting upwardly from the rear of the cart to the front end thereof, the front end thereof including an openable gate, means for driving the belt to move the contents of the basket out through the open end thereof, the gate being open, said driving means comprising positive geared mechanism including a clutch face, the latter facing forwardly and the driving shaft at the counter being generally parallel to the cart and including a separate but cooperative complementary clutch face engaging the same to drive the positive gearing and thereby the belt, and guide means at the checkout counter centering the cart relative to said driven shaft, said guide means being located at the sides of the cart and engaging the same at the lateral sides thereof.

4. The combination of claim 3 including means mounting the guide means for substantially free motion, said guide means being moved by the sides of the cart, and an electric switch controlling the shaft on the counter adapted to be engaged and actuated by said guide means.

References Cited by the Examiner

UNITED STATES PATENTS

| | | |
|---|---|---|
| 2,791,338 | 5/1957 | St. Andre. |
| 2,849,129 | 8/1958 | Likens _____ 214—38.20 |
| 2,943,707 | 7/1960 | Ramlose. |
| 3,028,931 | 4/1962 | Donovan. |
| 3,036,722 | 5/1962 | Sharaway. |
| 3,075,659 | 1/1963 | Sylvester _____ 214—38.20 |
| 3,083,791 | 4/1963 | Shoffner. |
| 3,115,975 | 12/1963 | Thompson. |
| 3,157,299 | 11/1964 | Ingham _____ 214—38.20 |

SAMUEL F. COLEMAN, *Primary Examiner.*